Patented Feb. 1, 1927.

1,616,171

UNITED STATES PATENT OFFICE.

WILLIAM C. ARSEM, OF SCHENECTADY, NEW YORK, ASSIGNOR TO INDUSTRIAL TECHNICS CORPORATION, OF SCHENECTADY, NEW YORK, A CORPORATION OF NEW YORK.

HYDROLYSIS OF INULIN.

No Drawing. Original application filed July 12, 1921, Serial No. 484,153. Divided and this application filed August 14, 1924. Serial No. 731,966.

This invention relates to an improved method of preparing fructose from inulin and to an improved product resulting from the application of this method in its preferred form.

The method of the present invention is applicable to inulin-containing materials of any kind but preferably it is applied to clarified and purified inulin solutions obtained from the juice of the dahlia bulb in accordance with the methods described in my copending applications, Serial No. 369,537 and Serial No. 424,459. When the improved method is applied in its preferred form to pure inulin, prepared according to these processes, the final fructose sugar product obtained is of unusual purity and is especially suitable for consumption as a food and also possesses unusually good keeping qualities.

Many attempts have hitherto been made to prepare a low cost sugar in the form of syrup, crystals, powder or the like, which could be substituted for sucrose (i. e. beet or cane sugar) for certain important uses such as the preparation of soda syrups and soft drinks, the preservation of fruits, the manufacture of confectionery, for general cooking purposes, for table use and similar purposes. But these attempts have been at most only partially successful. The non-sucrose syrups prepared hitherto for commercial consumption, such as starch syrups, corn syrups, malt syrups and the like, and all the solid, powdered and partially crystalline products prepared from similar sources, have failed to meet the requirements which a sugar must have in order to compete in the market with cane and beet sugar products for many important commercial purposes.

Thus, for example, none of the foregoing non-sucrose or sucrose substitute syrups are even approximately as sweet as the syrups prepared from cane or beet sugar. Also such syrups are usually highly colored and, therefore, cannot be used for many purposes for which ordinary refined cane or beet sugar syrup is employed and furthermore, certain of these syrups possess peculiar or variable flavors which render them undesirable for many of the purposes mentioned. Thus in the preparation of carbonated or soft drinks it is desirable that the syrup used shall have a definite and uniform flavor. If the stock syrup or sugar from which the soda-syrup is prepared has a peculiar or variable flavor of its own, it is not possible to prepare from it (by adding a natural or artificial flavoring substance) a soda syrup having a flavor or taste of the desired definiteness or purity and uniformity. On the contrary in such instances the finished soda-syrup will have a mixed flavor and this will vary with the varying flavor of the stock syrup with which the natural or artificial flavoring material or extract is mixed to produce the finished soda-syrup.

Likewise in the production of confectionery and culinary products uniformity and purity of flavor of the finished product is one of the most important requirements and therefore the sugar or syrup used must not possess a variable flavor and preferably should not have a highly pronounced flavor of its own.

Furthermore, uniformity of color of all of the above mentioned finished products is an important additional requirement and for this reason stock syrups or sugars with a pronounced or non-uniform or objectionable color of their own are not suitable for these very important commercial uses.

The various solid, powdered, and partially crystalline commercial forms of the non-sucrose products hitherto produced do not meet the foregoing requirements and in addition most of them have also the undesirable property of absorbing moisture and becoming more or less pasty so that they cannot be readily handled. Many of them also undergo objectionable decompositions, when an attempt is made to keep them in storage for any considerable length of time or when they are employed in cooking operations or in the manufacture of confectionery.

The product of the present invention fulfills all the foregoing requirements to an extraordinary degree and does not possess any of the above mentioned objectionable qualities and particularly it possesses the property of sweetness in much greater degree than even cane or beet sugar. It is almost, if not quite, as free from objectionable colored impurities as is ordinary refined cane sugar syrup, so that it may be employed for all the purposes for which ordinary water-white cane sugar syrup is employed. Furthermore, in syrup form it may be cooked or boiled without discoloration. Also in syrup form or in crystalline or solid form the fructose-sugar food-product of the present invention is resistant toward the attack of certain objectionable molds and bacteria and therefore possess good keeping qualities.

Because of the ready availability and cheapness of the raw materials used and the simplicity and economy of the method by means of which, the finished product of the present invention is produced, it can be manufactured at a very low cost.

The methods hitherto commonly employed for preparing pure fructose from inulin involve complicated and expensive methods of re-crystallization, usually from alcohol. Such recrystallization or other purification is made necessary because the older methods of hydrolysis yield discolored products or products which contain hygroscopic, deleterious or otherwise objectionable impurities and which are therefore unsuited for many of the uses for which ordinary refined cane sugar products are employed. This is true even when highly purified inulin is used.

These impurities are very difficult to remove from the fructose by bleaching treatments, crystallization or similar methods and therefore to obtain the fructose in even an approximately pure form by these older methods, it has been necessary to repeat the purification treatments a great many times. The final yield of fructose so obtained is, therefore, so small that the cost of manufacturing by these older methods upon a commercial scale would be prohibitive.

The method of hydrolysis employed in producing the product of the present invention produces fructose of a high degree of purity directly from the inulin and thus avoids all the foregoing difficulties and disadvantages. It is based mainly upon a regulated hydrolysis of the inulin under definitely controlled conditions and in its preferred form the hydrolysis is carried out with a selected acid and also with a definite range of concentration of the acid. One of the most important features of the improved method referred to is the adjustment of the time of hydrolysis to varying concentrations of acid and to the varying chemical nature of the acid. It has been found that highly advantageous results are obtained by stopping the hydrolysis at the end of a definitely determined period of time. In determining this correct time of hydrolysis, account is taken, as already mentioned, not only of the chemical nature of the acid but also of the concentration of the acid and also in certain instances of the temperature and pressure. By conducting the hydrolysis in this manner the inulin is readily hydrolyzed completely into fructose of a very high degree of purity and a solution of pure fructose is obtained directly from the inulin solution without the necessity of resorting to the older elaborate and expensive methods of purification or crystallization previously mentioned. Moreover, in the preferred form of the invention, the fructose is obtained directly in the form of a highly concentrated syrup and thus the cost of evaporating the solution is entirely avoided.

In other methods sometimes employed in the hydrolysis of inulin, a great deal of uncertainty has existed as to the optimum duration of the hydrolysis in order to obtain best yields of fructose. These uncertainties in the older methods referred to are due in large part to the circumstance that the intermediate hydrolytic products of inulin, as well as the decomposition products, resulting from various side reactions, all have properties which resemble those of fructose. If, therefore, one selects any convenient property of fructose and attempts to determine the concentration of the fructose in the mixed solution by measurements of this property, the results obtained will represent the resultant value of this property for all of the substances present. Thus, for example, since many of the hydrolytic and decomposition products are optically active or possess the power to rotate the plane of polarized light, the measurement of this property, as the hydrolysis progresses, does not always give a true measure of the concentration of fructose in the solution but corresponds to the resultant rotation of the mixture of all the optically active substances present. The measurement of the reducing power of the solution, as a means of following the progress of hydrolysis, leads to similar confusing results for a similar reason, namely, that the various hydrolytic and decomposition products each has a characteristic reducing power of its own and, therefore, the reducing power of the mixed solution represents the resultant of that of all the substances present and cannot be used as a measure of the concentration of any single one of the products present. It is, therefore, exceedingly difficult to determine just when the concentration of fructose in the mixed solution has reached a maximum value.

In the method of the present invention as the hydrolysis of inulin progresses, the value of the negative rotation of polarized light produced by the solution, usually increases at the beginning of the hydrolysis and then later decreases. In other methods this first maximum negative value of rotation has frequently been taken to indicate the highest obtainable concentration of fructose in the solution. I have discovered, however, that this is not the case and that if the hydrolysis be continued after this first maximum negative rotation is reached, the negative value of the rotation again usually increases and passes through a second maximum. Similarly several different maximum values of negative rotation may be passed through during the course of the hydrolysis before the highest possible negative rotation is attained. Furthermore, I have found that when the hydrolysis is carried out in accordance with the method of the present invention, this final maximum or highest attainable negative rotation, corresponds very closely to the maximum theoretical rotation of the solution calculated upon the basis that all of the inulin present in the solution is converted entirely into fructose. In this calculation the specific rotation $[\alpha]_D$ of fructose is taken as minus ninety three degrees and the concentration of inulin in the solution is calculated from the weight of purified inulin dried to constant weight at 90° C., which was originally employed in making up the solution.

Fructose exists in two tautomeric forms which are probably stereoisomers, and are supposed to have the following formulæ—

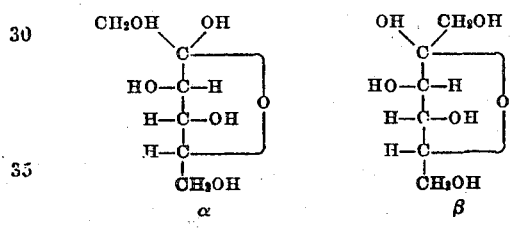

The beta form, which is the ordinary crystalline form of fructose in the pure state has a theoretical rotation of minus 135.5° at 20° C., but when dissolved in water a portion of the beta form is supposed to change over into the alpha form, which has not been isolated as far as the applicant knows, but has a calculated rotation of —21° at 20° C. The net effect after equilibrium is reached is that the rotation of the mixture as a whole assumes an approximate value of about —93° at 20° C. and this permanent or equilibrium value will be referred to in the claims as the maximum negative rotation. In this calculation the formula of inulin dried under these conditions is taken as $C_{36}H_{62}O_{31}$.

The foregoing methods furnish criteria for judging the extent of the hydrolysis of inulin to fructose and therefore furnish means of determining the total amount of impurities present in any given instance under the particular conditions of hydrolysis employed. The total amount of these impurities corresponds to the difference between the percentage of inulin which is completely hydrolyzed to fructose and one hundred per cent. I have found that these impurities are objectionable because they interfere with the subsequent crystallization of fructose from solution and also because they impart increased hydroscopic properties to the solid fructose obtained by crystallization or by evaporation of the hydrolyzed solution completely to dryness, in accordance with methods such as that described in my copending application, Serial No. 369,537. Moreover, in many instances certain of these impurities, particularly those formed by the decomposition of fructose after the latter has been formed, produce objectionable discoloration of the solution and also discolor the solid fructose obtained therefrom. They also impart a variable or objectionable flavor to the product.

Also I have found that there is an optimum concentration for any given acid, by means of which substantially one hundred per cent conversion of inulin to fructose can be obtained. A greater or smaller concentration than this optimum concentration gives a poorer result. It has now been found that to obtain a maximum conversion with a strong inorganic acid requires a greater optimum concentration of acid than with an organic acid. Thus, for example, the optimum concentration for hydrochloric acid is approximately five hundredths normal, while with acetic acid the optimum concentration is only about six thousandths normal. With hydrochloric acid of this optimum concentration, the maximum conversion of inulin to fructose is reached in about five to ten minutes, whereas with acetic acid, of the above given optimum concentration, eight hours are required to produce a maximum conversion of the inulin to fructose.

Furthermore, I have discovered that the time required to reach a maximum conversion with any given acid bears a certain definite and fixed relation to the concentration of the acid and that for each kind of acid, keeping the inulin concentration constant, this optimum time required for maximum conversion increases as the concentration of the acid diminishes, in such a way that the logarithm of the reciprocal of the time is approximately proportional to the logarithm of the normal concentration of the acid. In other words, the acid strength plotted against the reciprocal of the corresponding time gives an approximately straight line on logarithmic paper. A different line is obtained, of course, for each kind of acid. Furthermore, I have discovered that the results obtained with certain organic acids such as acetic, citric and tartaric acid and the like when plotted in this manner, give straight lines which are approximately parallel and which lie relatively close together. In other words, I have discovered that for different acids belonging to this general class, approximately the same quantitative relationship exists between different concentrations of the acid and the corresponding time required for producing the highest possible conversion of inulin to fructose. This relationship may be approximately expressed by means of the following equation:

$$\text{Log. } N = a \log. \frac{1}{T} + \log. b,$$

in which "N" represents the normality of the acid in the usual sense, assuming that only the first hydrogen ion of the acid is active, while "T" is the time required for the highest possible yield, expressed in hours and in which the constant "a" has a value between about 1, and the constant "b" has a value varying between about .0075 and .03. The foregoing relationship between concentration and time holds good for temperatures between about 70° C. and 120° C. and for pressures of about one atmosphere. This relationship is not seriously affected by changes in the original concentration of the inulin solution for concentrations greater than about eight per cent by weight.

While it is desired that the scope of the present invention shall not be restricted by any unproven assumptions as to the exact chemical nature of the reactions produced during the hydrolysis by strong inorganic acids, such as hydrochloric acid, which form the subject matter of the present application, it is believed that the wide differences which exist in the action of strong inorganic acids and the weaker organic acids may be best explained as follows. The acid, it is thought, acts as a catalyst in the hydrolysis of inulin by virtue of the hydrogen ion concentration, while the failure of any given acid to produce a one hundred per cent conversion under certain conditions or with certain concentrations is believed to be due to a condensing action of the undissociated molecules of the acid or of the anion upon the products of the hydrolysis of inulin and particularly upon the fructose. In other words, at each stage of the hydrolysis there seem to be two reactions going on which are opposed to each other in their effects, one reaction producing hydrolysis of inulin, probably through several intermediate stages, and another reaction bringing about a decomposition or a condensation of the different hydrolytic products and particularly of fructose.

I believe that there are three principal stages in the hydrolysis of inulin and that two principal intermediate hydrolytic products are formed before fructose is produced, thus Inulin—compound #1—compound #2—fructose. The reason, according to my belief, that the final stage has never hitherto been completely attained, is that the hydrolysis has been conducted under such conditions that the acid destroys the frustose or the intermediate compounds forming hydroscopic substances such as levulosin, and also other decomposition products such as humin, levulinic acid, formic acid, etc. It is my belief also that the several different maxima of polarization already described, which are obtained during the course of the hydrolysis, correspond to maximum concentrations of these principal intermediate hydrolytic compounds and I am convinced that this is the reason that the significance of these different maxima has hitherto been misunderstood resulting in a failure to obtain pure fructose directly from inulin as in the improved method of the present invention.

Among the principal advantages of the improved fructose food-product of the present invention, as compared with similar products hitherto known, are its greater stability especially toward heat, its exceptionally good keeping qualities, and in solid or crystalline form its greater freedom from a tendency to cake or become pasty when exposed to a moist or humid atmosphere. These special advantages of the new product particularly its greater stability toward heat and its improved keeping qualities are due in large part, I believe, to the unusual purity of the product and to the nature and degree of its acidity. In some instances (and particularly where good keeping qualities are especially desired) I have found that these advantageous properties can be increased by first hydrolyzing the pure inulin with the limited amount of acid as specified and then after the hydrolysis is completed and the product has cooled, adding an additional amount of acid either to the syrup or to the solid or crystalline product obtained therefrom by evaporation or crystallization, as for example, by the method of evaporation and crystallization described in my co-pending applications, Serial No. 369,537 and Serial No. 424,459. Where the product is intended for consumption as a food itself or as a constituent of a food, I prefer to add an innocuous or edible acid such as citric acid and preferably tartaric acid or an acid tartrate or the like.

In the manufacture of candy or confectionery and in many culinary operations where a sugar is employed, it is highly desirable that the sugar shall not decompose or darken in color when cooked or heated and the improved pure fructose food-product of the present invention meets these requirements in a much more satisfactory manner than any similar product hitherto known.

This application is a divisional application of my co-pending application, Serial No. 484,153.

I claim:

1. The method of converting the inulin to fructose which comprises subjecting the solution containing purified inulin to the action of an inorganic acid present in the solution in a concentration corresponding to about five hundredths (.05) normality for a period of about five minutes.

2. The method of converting inulin to fructose which comprises subjecting the solution containing purified inulin to the action of an inorganic acid present in the solution in a concentration corresponding to about five hundredths (.05) normality for a period of about five minutes at a temperature of about 100° C.

3. The method of converting inulin to fructose which comprises subjecting the solution containing purified inulin to the action of hydrochloric acid present in the solution in a concentration corresponding to about five hundredths (.05) normality for a period of about five minutes at a temperature of about 100° C.

In testimony whereof I affix my signature.

WILLIAM C. ARSEM.